United States Patent Office 3,488,342
Patented Jan. 6, 1970

3,488,342
PREPARATION OF HYDRAZO AND AZODIFORMATE DIESTERS
Chester S. Sheppard, Kenmore, Herman P. Van Leeuwen, Rochester, and Orville L. Mageli, Kenmore, N.Y., assignors to Pennwalt Corporation, a corporation of Pennsylvania
No Drawing. Continuation-in-part of application Ser. No. 642,337, May 31, 1967. This application Dec. 11, 1967, Ser. No. 689,245
Int. Cl. C07c 69/64, 107/00, 109/00
U.S. Cl. 260—192    11 Claims

ABSTRACT OF THE DISCLOSURE

A process for preparing certain hydrazodiformate, diesters by reacting the corresponding haloformate, hydrazine and a base in a liquid reaction medium consisting of water.

The corresponding azodiformate diesters are prepared by oxidation of the mixture of hydrazo diester-liquid reaction medium, obtained in the hydrazo reaction.

RELATED APPLICATIONS

This is a continuation-in-part of our copending application Ser. No. 642,337, filed May 31, 1967, and now abandoned which is a continuation-in-part application of our application Ser. No. 337,124, filed January 13, 1964 and now abandoned.

BACKGROUND OF THE INVENTION

This invention relates to a novel process for preparing azodiformate diesters and hydrazodiformate diesters.

In U.S. Patents No. 3,306,862 and 3,347,845, there is set out a novel utility of azodiformate diesters as blowing agents for polymeric materials such as rubber, polyethylene, vinyl chloride, etc. In order to be of commercial interest, these materials must be available in good purity at a reasonable price. The prior art processes are complicated or involve rare chemical intermediates.

The better known processes use a two step procedure wherein haloformate, hydrazine and base are reacted in a medium comprising water and an organic solvent and the hydrazo diester product is separated from the reaction medium; the hydrazo diester is then oxidized to the corresponding azodiformate diester in the presence of liquid reaction medium; the azodiformate diester is then recovered from the second reaction medium, usually by distillation.

The preparation of diethyl azodiformate is described by Rabjohn, Organic Syntheses 28, 59, and also by Kauer, Organic Syntheses, collective volume IV, 411–415 (1963).

The preparation of dimethyl azodicarboxylate is described by A. Rodgman and G. F. Wright, J. Org. Chem., 18, 481–482 (1953) using a modified Rabjohn procedure.

Rabjohn, Kauer and Rodgman et al. prepared diethyl hydrazodiformate by starting the reaction by adding 1 mole ethyl chloroformate to a solution of hydrazine hydrate in 95% ethanol. After one-half of the chloroformate had been added, a second mole of chloroformate was added simultaneously with 1 mole of sodium bicarbonate in 500 ml. of water. Rabjohn and Kauer filtered the solids, 82–85% diethyl hydrazodiformate, from the liquid. Rodgman et al. used a very elaborate procedure to recover a "high purity" hydrazodiformate product.

Rabjohn and Kauer each converted the hydrazodiformate by oxidizing the solid in the presence of water and benzene; the benzene dissolves the azodiformate product. The yields were 70–83% of diethyl azodiformate. To get a higher purity, Rabjohn and Kauer had to vacuum distill their products.

Applicant's discovered that under the conditions of the prior art where ethanol, stoichiometric amounts of ethyl chloroformate and hydrazine are present, a side-reaction occurs to produce ethyl carbazate which is an oxidizable impurity. When less than a stoichiometric amount of chloroformate is charged, the formation of carbazate is an important side reaction. In the prior art, ethanol and chloroformate react, in the presence of base, to form carbonate—this results in the reaction system having less chloroformate available and the carbazate impurity is produced. A further bad result of this side-reaction is that non-reacted hydrazine is present in the hydrazodiformate.

Also the applicants found that the use of oxidizer in amount to convert both the impurities and all the hydrazodiformate, produced other side-reaction products which could not be readily separated from the azodiformate product.

The use of water as the liquid reaction medium eliminated these side-reactions and gave a hydrazodiformate product pure enough to be oxidized to the azodiformate without separation of the hydrazodiformate from the water used in the hydrazo reaction, which water includes the salt formed by reaction of acid released in the reaction and the added base.

OBJECTS

An object of this invention is a process for making azodiesters from haloformate and hydrazine in which the hydrazo diester intermediate is pure enough so as not to require its physical separation prior to oxidation to azodiester.

Another object is a process which produces essentially pure azodiester without having separated the charge hydrazodiester from its reaction medium.

Yet another object of this invention is such a process which does not require the very large volume of solvents used by the above prior art processes.

Still another object of this invention is such a process which does not utilize organic solvents in one or even in both reaction steps.

Other objects of the invention will be apparent from the detailed description thereof.

SUMMARY OF THE INVENTION

It has been discovered that hydrazodiesters are produced in a very high yield by the reaction of "haloformate," stoichiometric hydrazine and alkaline compound, in a liquid reaction medium consisting of water. Oxidation of the hydrazo diester product gives the corresponding azodiester. The oxidizing agent is added directly to the hydrazo diester containing reaction product mixture of the haloformate-hydrazine reaction, i.e., without having physically separated the hydrazo diester from the liquid reaction medium.

DESCRIPTION OF THE INVENTION AND EMBODIMENTS

I—Hydrazodiester process

The process of the invention may use hydrazine, hydrazine hydrate or a hydrazine complex, such as hydrazine sulfate, which behave like hydrazine in this reaction.

The haloformate ester reactant may be a simple ROOCX compound or it may be a polyfunctional compound such as XCOOROOCX; X is chloro, preferably, or bromo. The reaction is not limited by the chemical nature of the ester affording group as long as the hydrazo diester formation reaction is not interfered with. Commonly the ester affording group, i.e., R in ROOCX, is aliphatic, cycloaliphatic or phenyl. Particularly suitable groups are aliphatic hydrocarbon, cycloaliphatic hydrocarbon, phenyl, haloaliphatic hydrocarbon, halocycloaliphatic hydrocarbon and halophenyl hydrocarbon. The especially suitable aliphatic hydrocarbon haloformates and haloaliphatic hydrocarbon haloformates have 1–15 carbon atoms and the especially suitable secondary aliphatic hydrocarbon or secondary haloaliphatic hydrocarbon haloformates have 3–15 carbon atoms. Illustrative preferred chloroformates are: methyl chloroformate, ethyl chloroformate, 2-chloroethyl chloroformate, isopropyl chloroformate, n-propyl chloroformate, isobutyl chloroformate, sec-butyl chloroformate, dodecyl chloroformate, sec-octyl chloroformate, 2-ethylhexyl chloroformate, phenyl chloroformate, benzyl chloroformate and cyclohexyl chloroformate.

The hydrazine and haloformate ester are charged in essentially the stoichiometric amounts. In some situations an excess of haloformate may be charged.

An acid-acceptor alkaline compound is present in the reaction zone to react with the hydrogen halide released during the hydrazo diester reaction. This alkaline compound must not interfere with the reaction and is, desirably, one whose salt can be easily separated from the azodiformate diester product. The alkali metal hydroxides and alkali metal carbonates and alkali metal bicarbonates are preferred acid acceptors. Preferably the alkaline compound is present in an amount equal to the acid released in the reaction.

The hydrazo diester reaction is carried out in a liquid reaction medium consisting of water. The medium may include minor amounts of other non-reactive liquids, but in the preferred process of the invention, water is the sole liquid component of the liquid reaction medium.

Sufficient water is present to dissolve the hydrazine, the alkaline compound and salt produced. It is preferred to have enough water present to aid in temperature of the tenance and to form an easily stirred dispersion of the insoluble hydrazo diester product and liquid reaction medium.

The hydrazo diester reaction is exothermic; it is preferred to add the haloformate incrementally to the reaction zone, in order to aid in maintaining the zone at the desired reaction temperature.

The hydrazo diester reaction is carried out at any suitable temperature, desirably below about $+90°$ C.; usually between about $-20°$ C. and about $+70°$ C. Preferably a temperature of about $+5°$ to $+60°$ C. is used.

II—Azodiester process

The reaction product mixture comprising liquid reaction medium and hydrazo diester product may be used without separation, as reactant and liquid reaction medium for the conversion of the hydrazo diester to the desired azodiformate diester. Organic solvents inert to the reactants and their products, such as, ethers, halohydrocarbons and hydrocarbons may be present along with water; water insoluble solvents are preferred. Illustrative organic solvents are: isopropyl ether, methylene chloride, benzene, and cyclohexane. It is preferred to use water solely as the liquid reaction medium in the conversion reaction zone.

An oxidizing agent is added to the hydrazo diester reaction product mixture to convert the hydrazo diester to the corresponding azodiformate diester. While any oxidizing agent may be used which will convert the hydrazo group to the azo, it is preferred to use an acidic oxidizing agent, e.g., a halogen such as chlorine and bromine or nitric acid. Other agents which can be used are: potassium permanganate, potassium dichromate, nitrogen dioxide and t-butyl hypochlorite.

The yield of azodiester increases as the amount of oxidizer used approaches the theoretical requirement, with the best combination of purity and yield being obtained at about the theoretical usage. Increasing the usage substantially beyond the theoretical should be avoided, as undesirable contaminants are formed which cannot be readily separated from the azodiester product.

Preferably the oxidizing agent is added incrementally to the reaction zone while the temperature is held in the desired range. Temperatures used in the conversion reaction zone are in the range of about $-20°$ C. to $+60°$ C. and preferably are about $+5°$ C. to $+50°$ C.

EMBODIMENTS

The process of the invention is illustrated by the following examples. It is to be understood these examples do not limit the scope of the invention which is intended to be as set forth in the claims.

EXAMPLE 1

Preparation of diisopropyl azodiformate without using an organic solvent

The entire reaction was carried out in a 3 liter open top glass reactor kettle that was jacketed for cooling and that was equipped with a bottom drain valve for separating the removing liquid layers. The reactor kettle was charged with a solution containing 76.2 grams of hydrazine and 260 grams of sodium carbonate in 1589 ml. of water. The solution was cooled to about $+10°$ C. by circulating cold water through the jacket of the reactor kettle.

While maintaining efficient stirring in the reactor kettle, the addition of 614 grams of 95% pure isopropyl chloroformate was started. This addition was completed in about 45 minutes with the temperature being maintained at $10°$ C. $\pm 2°$ C. throughout the addition. The reaction product mixture, which was a suspension of diisopropyl hydrazodiformate in the water solvent, was stirred for 15 minutes. Then the solids adhering to the side of the reactor and the stirrer shaft were washed down with 200 ml. of water.

While the reaction temperature was maintained at $10°$ to $18°$ C. chlorine gas was then admitted to the stirred hydrazo reaction product mixture as fast as it could be completely absorbed. After a total of 177.5 grams of chlorine was admitted, the chlorine addition was discontinued. The reaction mixture was stirred for an additional 30 minutes; then the mixture was allowed to separate into two layers. The lower aqueous layer was removed and discarded. The orange color product layer was washed once with 250 ml. of aqueous sodium chloride and then once with 500 ml. of 10% sodium bicarbonate solution. Anhydrous sodium sulfate drying agent was then added.

The pure, dry product, weighing 454 grams was isolated by draining the liquid product through a filter to separate it from the drying agent (92% yield).

Several separate preparations produced assayed diisopropyl azodiformate 97—99.5% purity. The yields of the azodiester obtained from these preparations ranged from 92 to 97% based on the hydrazine charged. The purity of the product was determined by hydrogen iodide titration of the azo linkage. The structure of the molecule was determined by infra red spectroscopy.

The dissopropyl azodiformate is an orange liquid having a boiling point of $75.5°$ C. at 0.25 mm. Hg.

EXAMPLE 2

Preparation of dimethyl azodiformate

The entire reaction was carried out in a 5 liter open top glass reactor kettle that was jacketed for cooling and that was equipped with a bottom drain valve for separating the removing liquid layers. The reactor kettle was charged with a solution containing 105.7 grams of hydrazine in 1500 ml. of water. The soultion was cooled to about $+10°$ C. by circulating cold water through the jacket of the reactor.

While maintaining efficient stirring the addition of 673 grams of 97.5% pure methyl chloroformate was started.

The reaction is exothermic and sufficient cooling was used to maintain a reaction temperature of 10° C. ±2° C.

When one-half of the methyl chloroformate (336.5 grams) had been added, the simultaneous addition of 367.7 grams of sodium carbonte powder was begun. The rate of the sodium carbonate addition was controlled so that the methyl chloroformate addition was completed in advance of the sodium carbonate addition. A reaction temperature of 10±2° C. was maintained. The total addition time was about one hour.

After stirring for an additional 15 minutes, 786 ml. of methylene chloride solvent was added. While the reaction mixture was maintained at 0–5° C., chlorine gas was admitted to the stirred hydrazo reaction product mixture as fast as it could be completely absorbed. After a total of 258.0 grams of chlorine was admitted, the chlorine addition was discontinued. The reaction mixture was stirred for an additional 10 minutes and then the reactor contents were allowed to separate into two layers.

The lower orange colored methylene chloride layer was drawn off. The aqueous layer was washed with 120 ml. of methylene chloride. The "wash layer" was drawn off and combined with the first methylene chloride layer. The aqueous layer was discarded. The combined methylene chloride layers were washed with 250 ml. of 15% sodium chloride solution and then with 500 ml. of a 10% sodium bicarbonate solution.

The solution was then dried over anhydrous sodium sulfate and filtered. The methylene chloride solvent was then removed under vacuum (about 20 mm. of Hg) at +40° C. 454 grams of dimethyl azodiformate, an orange liquid, of approximately 97.5% purity was obtained —92% yield. This azodiester is very shock sensitive in purities of 90% or better.

EXAMPLE 3

Preparation of diisopropyl azodiformate in the presence of an organic solvent

The reaction was carried out as in Example 1 except that after the isopropyl chloroformate addition was completed and prior to the chlorine addition, one-half of the water solvent (887.5 ml.) was removed and 887.5 ml. of methylene chloride was added.

When the chlorine addition was completed, the reaction mixture was stirred for an additional 30 minutes and then worked up as in Example 2 to isolate the diisopropyl azodiformate. The yields and purity of the azodiester obtained from several runs were within the experimental error identical to those of Example 1.

EXAMPLE 4

Preparation of diethyl azodiformate

The procedure used for making diethyl azodicarboxylate was essentially the same as that used in Example 3 for the diisopropyl azodiester; a somewhat larger (4 liter) reactor kettle was used. The following amounts of reactants and solvents were used to make 454 grams of product:

(1) A solution containing 89.2 grams of hydrazine and 304.7 grams of sodium carbonate in 1909 *ml.* of water.
(2) 636.2 grams of 95% pure ethyl chloroformate.
(3) 1153 ml. of methylene chloride.
(4) 210.0 grams of chlorine.
(5) 250 ml. of 15% sodium chloride solution.
(6) 500 ml. of 10% sodium bicarbonate solution.

The diethyl azodicarboxylate obtained from several successive runs assayed between 97–99% and the yields based on hydrazine were at least 94%.

EXAMPLE 5

Using the procedure of Example 2, di-sec-butyl azodiformate was prepared in a yield of 96.6%. This azodiester is an orange liquid having a boiling point of 71.5° C. at 0.07 mm. Hg.

EXAMPLE 6

Using the procedure of Example 2, di-sec-octyl azodiformate was prepared in a yield of 95%. This azodiester is a high boiling orange liquid identified by infra red spectroscopy and hydrogen iodide titration of the azo linkage.

EXAMPLE 7

Preparation of dibenzyl azodiformate

The procedure of Example 1 was used with benzyl chloroformate, except that the chloroformate addition was completed at 25°–30° C. and the chlorine oxidation was carried out at 41°–47° C. to obtain dibenzyl azodiformate (M.P. 44–46° C.), assaying 95.3% by iodometric titration and possessing a sharp chloroformate-like odor.

When this same procedure was followed except that a temperature of 70° C. was used for the intermediate dibenzyl hydrazodiformate, the product obtained assayed 97.6% as dibenzyl azodiformate. The chloroformate odor was negligible.

Overall yields in both cases ranged from 89 to 92.5% for the dibenzyl azodiformate. The dibenzyl hydrazodiformate was isolated under both the 25 to 30° C., and the 70° conditions in 97% yields with the latter possessing only negligible chloroformate odors compared to the former's very strong odor.

The dibenzyl azodiformate was also prepared according to the procedure of Example 3, except that the dibenzyl hydrazodiformate was prepared at 25° C. to 70° C. and the chlorine oxidation was carried out at 20° to 30° C. The assays and yields were comparable to those obtained above using no solvent for the oxidation.

UTILITY

The dialkyl azodiformates exhibit a remarkable ability to generate gas and are excellent blowing agents for producing foamed polymers. Considering its molecular weight, the sec-octyl azodiformate is an efficient gas producer.

EXAMPLE 8

Foaming of polypropylene with diisopropyl azodiformate and dimethyl azodiformate (A) A 200 gram sample of a general purpose extrusion polypropylene resin (melt index=0.5 and density=0.915 g./cc.) in the form of ⅛" pellets was tumbled with 1.0 gram of diisopropyl azodiformate until the pellets were uniformly coated with the azo ester. This sample was then fed into the hopper of a one-inch bench extruder containing a 40, 80 and 100 mesh screen pack. The orifice was a flattened copper tubing ¼" x 1/32" I.D. The screw speed was 8 r.p.m. The barrel and head temperature were maintained at 240° C. (464° F.) and the nozzle temperature was maintained at 260° C. (500° F.). The three inch nozzle leading to the orifice was an unheated copper tube. The extruded closed-cell foamed polypropylene thus obtained had a density of 0.601 gram/ml.

(B) When 1.0 gram of dimethyl azodiformate was used as the blowing agent, foam densities of about 0.5 g./ml. were obtained; this is as predicted by the gas evolution test results.

EXAMPLE 9

Foaming of polypropylene with di-secondary-butyl azodiformate

Example 8A was repeated using 1.5 gram of di-sec-butyl azodiformate in place of the diisopropyl azo ester. The extruded closed cell foamed polypropylene thus obtained had a density of 0.612 gram/ml.

Examples 8 and 9 establish the suitability of the alkyl azodiformates as blowing agents for polymeric materials.

Thus, having described the invention, what is claimed is:

1. A process for the preparation of azodiformate diesters which process comprises:
   (1) reacting (a) a haloformate ester, (b) hydrazine, in essentially stoichiometric amount, and (c) an alkaline compound, selected from the class consisting of alkali metal carbonate, alkali metal bicarbonate, and alkali metal hydroxide, in an amount sufficient to react with acid released in said reaction, in a liquid reaction medium consisting of water at a temperature below about +90° C. to produce a reaction product mixture comprising hydrazodiformate diester, where "halo" in said ester is chloro or bromo; and
   (2) converting said hydrazodiester, by reaction, at a temperature below about +60° C., with an oxidizing agent, to the corresponding azodiformate diester, in a liquid reaction medium consisting of water, said hydrazodiester not having been separated from the reaction product mixture of step 1, said hydrazodiester being suspended as a slurry in said medium, the usage of said oxidizer being controlled up to an amount not in substantial excess of the theoretical requirement.

2. The process of claim 1 wherein said ester is isopropyl chloroformate.

3. The process of claim 1 wherein said ester is benzyl chloroformate.

4. The process of claim 1 wherein said temperature in (1) is about +5° to +60° C.

5. The process of claim 1 wherein said Step 1, said haloformate is the chloroformate of ethyl, 2-chloroethyl, isopropyl, n-propyl, isobutyl, sec-butyl, dodecyl, sec-octyl, 2-ethylhexyl, benzyl or cyclohexyl.

6. A process for the preparation of diisopropyl azodiformate which process comprises: reacting in liquid water at a temperature of about 10° C. over a period of about 60 minutes, stoichiometric amounts by hydrazine, sodium carbonate, and isopropyl chloroformate, where said chloroformate is added to the solution of water, hydrazine and sodium carbonate, to produce a reaction product mixture comprising diisopropyl hydrazodiformate; and producing diisopropyl azodiformate by oxidizing said hydrazodiformate without separation from said water, with about the theoretical requirement of chlorine at a temperature of about +10° C. and +18° C. over a period of about 30 minutes.

7. A process for the preparation of dibenzyl azodiformate which process comprises: reacting in liquid water at a temperature of about 25°–70° C. over a period of about 60 minutes, stoichiometric amounts of hydrazine, sodium carbonate, and benzyl chloroformate, where said chloroformate is added to the solution of water, hydrazine and sodium carbonate, to produce a reaction product mixture comprising dibenzyl hydrazodiformate; and producing dibenzyl azodiformate by oxidizing said hydrazodiformate without separation from said water, with about the theoretical requirement of chlorine at a temperature of about 41°–47° C. over a period of about 30 minutes.

8. A process for making hydrazodiformate diesters which process comprises:
   reacting a (1) haloformate ester, (2) hydrazine, in essentially stoichiometric amount, and (3) an alkaline compound, in an amount sufficient to react with acid released by said reaction, in liquid reaction medium consisting of water, at a temperature below about +90° C. to produce a reaction product mixture comprising hydrazodiester, where "halo" in said ester is chloro or bromo and said alkaline compound is selected from the class consisting of alkali metal carbonate and alkali metal bicarbonate, wherein said haloformate is added to the solution of said water, hydrazine and alkaline compound.

9. The process of claim 8 wherein said ester is isopropyl chloroformate.

10. The process of claim 8 where said ester is benzyl chloroformate.

11. A process for the preparation of diisopropyl hydrazodiformate which process comprises: reacting in liquid water at a temperature of about 10° C. over a period of about 60 minutes, stoichiometric amounts of hydrazine, sodium carbonate, and isopropyl chloroformate to produce a reaction product mixture comprising diisopropyl hydrazodiformate, wherein said chloroformate is added to the solution of said water, hydrazine and sodium carbonate.

References Cited
UNITED STATES PATENTS 2,554,141   5/1951   Flory et al. _____ 260—144
2,583,980   1/1952   Whitehill et al. ___ 260—482 XR

OTHER REFERENCES

Kauer, "Organic Syntheses," collective volume IV, pages 411 to 415 (1963).

Rabjohn, "Organic Syntheses," collective volume III, pages 375 to 376 (1955).

FLOYD D. HIGEL, Primary Examiner

U.S. Cl. X.R.

252—350; 260—93.7, 482